Sept. 1, 1964  W. B. LOWMAN  3,147,370
MEASURING AND CONTROLLING SYSTEM
Filed April 15, 1959  7 Sheets-Sheet 6

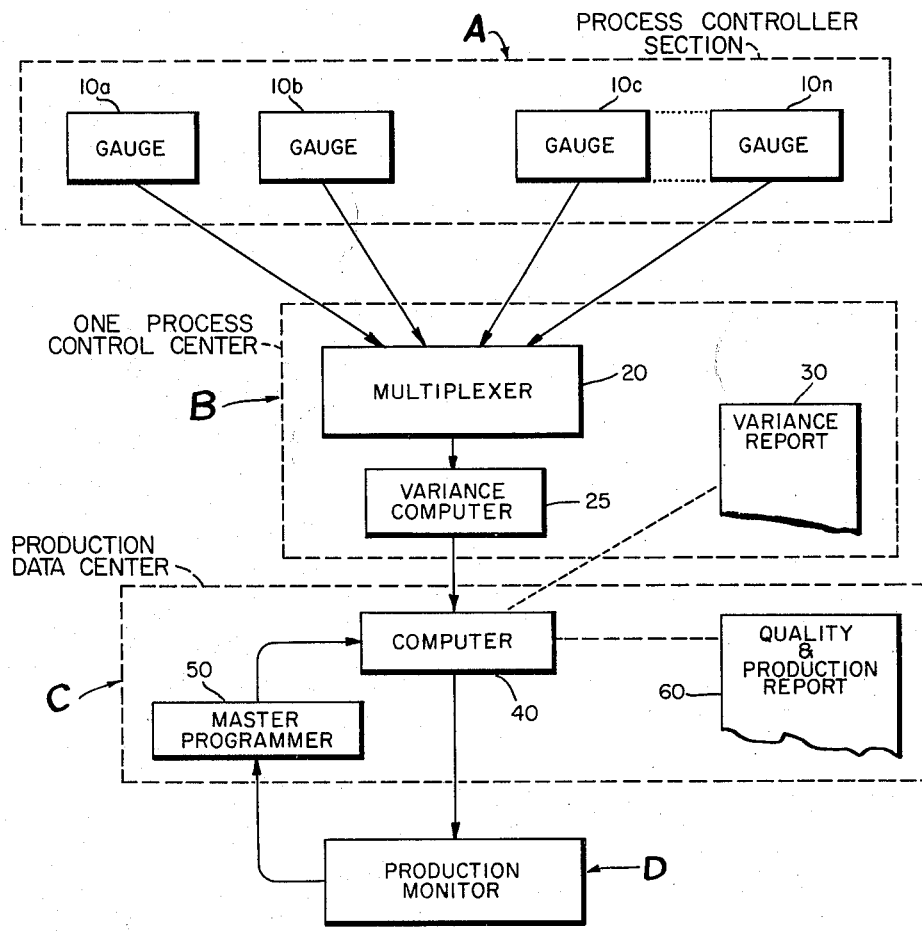
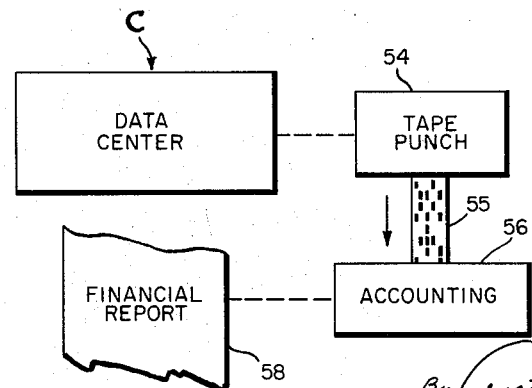

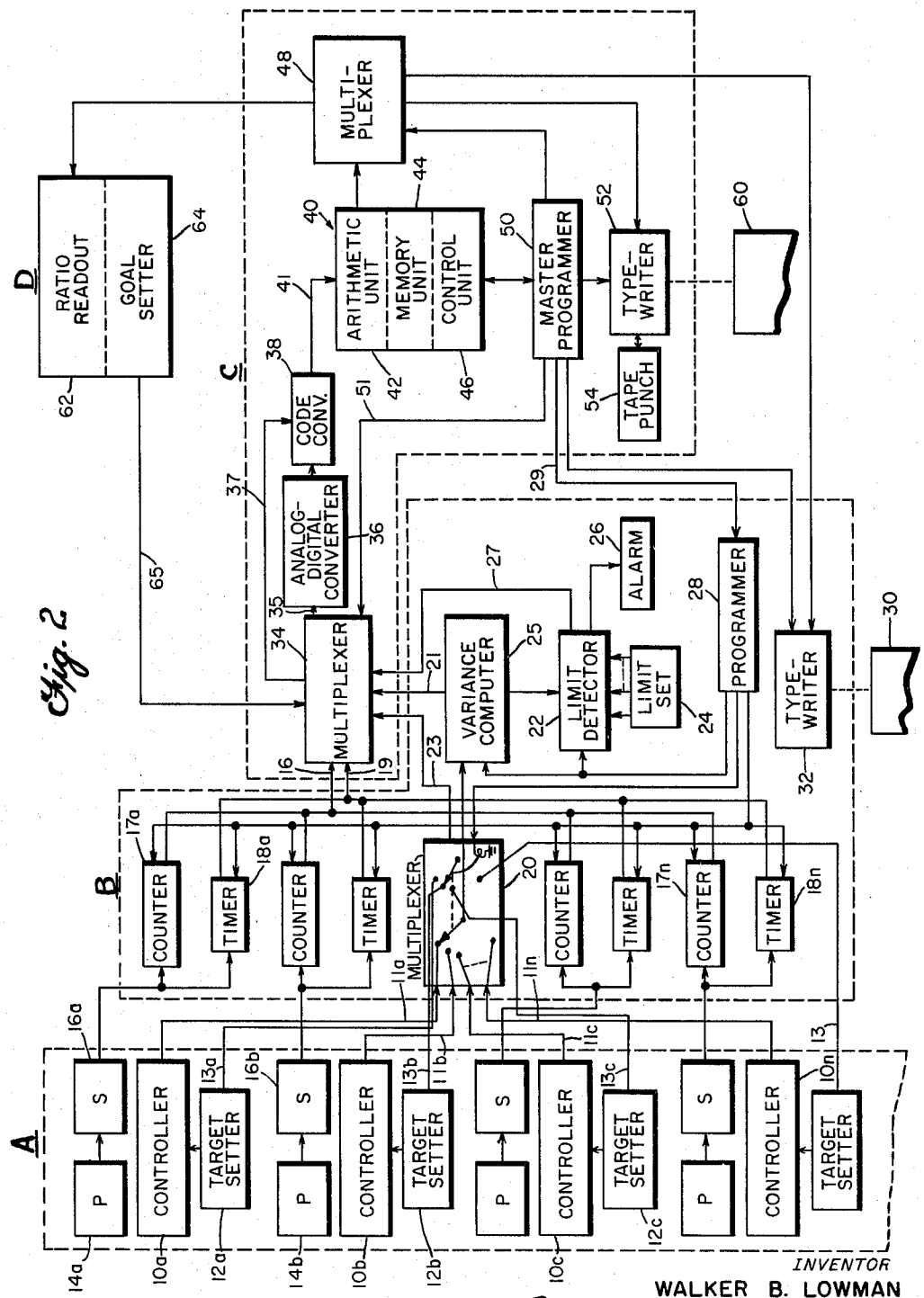

INVENTOR
WALKER B. LOWMAN

Sept. 1, 1964     W. B. LOWMAN     3,147,370
MEASURING AND CONTROLLING SYSTEM
Filed April 15, 1959     7 Sheets-Sheet 7

| OVERALL | | | | LINES | | | | |
|---|---|---|---|---|---|---|---|---|
| SET VARIANCE GOAL | | | ⊙ | | PRODUCTION | | VARIANCE | |
| | | | | | GOAL | RATIO | GOAL | RATIO |
| SET VARIANCE RATIO | | | ⊙ | LINE 1 | ⊙ | ⊛⊕ | ⊙ | ⊛⊕ |
| SET PRODUCTION RATIO | | | ⊙ | LINE 2 | ⊙ | ⊛⊕ | ⊙ | ⊛⊕ |
| BRANDS | | | | LINE 3 | ⊙ | ⊛⊕ | ⊙ | ⊛⊕ |
| | PRODUCTION | | VARIANCE | | LINE 4 | ⊙ | ⊛⊕ | ⊙ | ⊛⊕ |
| | GOAL | RATIO | GOAL | RATIO | | | | | |
| BRAND "A" | ⊙ | ⊛⊕ | ⊙ | ⊛⊕ | LINE 5 | ⊙ | ⊛⊕ | ⊙ | ⊛⊕ |
| BRAND "B" | ⊙ | ⊛⊕ | ⊙ | ⊛⊕ | | | | | |

PRODUCTION MONITOR

*Fig. 9*

INVENTOR
WALKER B. LOWMAN
By Anthony D. Cennamo 3,147,370
MEASURING AND CONTROLLING SYSTEM
Walker B. Lowman, Columbus, Ohio, assignor to Industrial Nucleonics Corporation, a corporation of Ohio
Filed Apr. 15, 1959, Ser. No. 806,675
9 Claims. (Cl. 235—151)

This invention relates to factory automation systems and more particularly to method and means for automatically accumulating, summarizing and presenting in concise convenient form the information necessary for effective quality, maintenance and production control.

In manufacturing processes today, information relative to many variables is vital to the production line control of product quality. This information is presently obtained in many of these manufacturing processes by manual techniques, the results of which not only are highly susceptible to inaccuracies due to the human element, but also are invariably non-representative measurements of the overall product quality due primarily to the insufficient number of samples that economic factors permit to be taken of the particular product by these manual methods.

For instance, the statistical variance of the weights of a product manufactured on a production line basis is obtained generally by laborious hand weighing of the product, usually in the laboratory. Moreover, the count of production pieces and the measurement of actual production time are frequently obtained either on a sampling basis, or by counting the overall production from a large number of producing units and assuming that the pattern of production from unit to unit is uniform. In addition, substandard performance of any particular producing machine was extremely difficult to detect immediately upon its departure from the desired product quality level when such detection was necessarily based upon the interpretation of consistently outdated production reports. It necessarily follows then that substandard performances, or failures other than complete mechanical breakdown, continued frequently for excessive periods of time, the undesirable result being the frequent shipment of faulty products.

Previously, devices were not available for reporting instantaneous product weight variations which, it is well known, were then and still are occurring constantly at each producing machine. Thus, the statistically valid index, namely variance, has heretofore not been effectively utilized as a continuous measure of performance of such producing machines. In fact, supervisory and management personnel have consistently been denied of an efficient use of this vital information which, in reality, would have been their most useful tool in the obtaining and maintaining of optimum control of production line variables. Similarly, production information pertaining to an actual physical count of the product being manufactured and the production time of each producing machine including the total number of times that substandard performance of the respective producing machine had occurred was only available for analysis by supervisory and management personnel after many hours, sometimes days and occasionally even weeks, had been spent in the compilation of manually obtained data and in the final preparation of production reports and/or summary reports based on these data. Such typical delays rendered this information useless so far as its evaluation and subsequent application could effectively achieve the desired control of production line variables.

The present invention relates to a quality and production control system wherein production information is automatically collected, collated, and operated thereon in a prescribed manner prior to the distributing and recording thereof for the ultimate purpose of product quality control, management control of production, and producing machine maintenance. This system operates on a continuous basis and presents this highly reliable production information to operating and supervisory personnel as well as to management personnel whereby same are constantly advised of production efficiency and quality on a per production unit, production unit group, floor, and plant basis. As such, the system is a highly effective tool for the maintaining of efficient, accurate control over the product manufacturing process.

More specifically, the instant system automatically computes the variance of a selected variable, such as weight, of a manufactured product produced on a production line basis. This information is vital to the precise control of product quality. Industry has indeed recognized the validity of variance as an accurate measure of performance of a manufacturing process, but, to date, the efforts directed toward the utilization of variance to its fullest have been most inadequate. The inherent errors of manual methods of inspecting, weighing, computing, and recording; the economic factor restricting the number of persons assigned to this task; and the time required to perform this task on a per product basis all have had pronounced effects on both the quality and quantity of the data heretofore used by industry to compute variance. However, the instant system dispenses with these manual techniques thereby virtually eliminating the inaccuracies and inefficiencies associated therewith and presents the computed variance immediately after the production of the product to which it relates.

The instant system also permits the setting of standards for many production quantities and qualities and the comparison of these standards with measured quantities and qualities without laborious manual computation. These standards may relate to limits that should not be exceeded, ratio ranges between actual and goal figures which are to be held, and operating quantity and quality targets for specific machines and/or production areas.

The statistical reliability of the data presented by the instant system is extremely high, this reliability being directly attributable to the large quantity of very accurate data collected and collated. As a consequence of this reliability, the goals, desired ratios, and limits can be quickly determined and set into the system for automatic comparison of the actual and desired values of product variable accordingly as prescribed. Any deviation of an actual value beyond a specified limit from the desired value may selectively be indicated by alarm devices, by distinctive markings on the typed reports, or by any other suitable means. Thus, it is seen that the warning function, previously residing in each operating person and not readily detectable by him in many cases due to the timely delays in receiving the pertinent portion of the reports briefly described hereinabove, is now a task performed by the system and is immediately presented to the proper personnel for remedial purposes. Hence, the system indicates substandard performance upon such occurrences and continues to so indicate until the fault is corrected.

The reports prepared by this system are generally of the same form as those now distributed to management and operating personnel. However, if otherwise, the inherent flexibility of the system readily allows the necessary or desired modification of the format of these reports to meet the need of the specific application of the present invention. Continuing, the system prepares these reports automatically and continually and makes them available immediately after the information contained therein has been collected and computed. This gives operating personnel the opportunity to take appropriate action to correct detrimental situations as rapidly as such situations are brought to their attention.

In cost accounting systems in use today, certain data are collected for the analysis of production efficiency. These data, being different from the data used by operating personnel, are seldom honored by the latter as a real indication of the condition of the production function. Moreover, accounting generally does not accumulate nor does it usually require data from the basic producing unit, but rather only summary data on a plant-wide basis. Hence, analysis of costs has heretofore been restricted to the average operating condition and, thus could not have pinpointed faulty techniques or faulty equipment existing in only a part of the operation. In contrast, the present system produces a permanent record containing all data collected and computed in a form compatible with accounting machinery now in use. Due to the completeness of these data and the speed with which these data are collected, the same cost figures heretofore used are now made available to management on a day-to-day basis. In addition, costs heretofore unavailable for each producing unit are now made available to management; directly, all of these costs are now subjectable to control as they are incurred rather than, as was usual in the past, weeks or months later.

The present invention is particularly adaptable to a cigarette manufacturing process and, for explanatory purposes only, will be subsequently described as a quality and production control system so adapted to meet the needs of the cigarette industry. It should be expressly understood, however, that the system herein disclosed and described is readily adaptable to other manufacturing processes and therefore should not be limited to scope in the particular industrial application herein exemplified.

Accordingly, it is a primary object of this invention to automatically provide a continuous, reliable report of the variance of a product of individual machines incorporated in a common process concomitantly with operating conditions.

It is also an object of this invention to automatically provide a periodic accurate report of the overall quality and production values representing the operating efficiency of each and all the machines engaged in the production of similar products.

Another object of this invention is to quickly and automatically provide, from actual production data, a periodic quality and production report which is superior in statistical reliability to the reports laboriously derived by present day manual data collecting and computing techniques.

It is another object of this invention to provide a report of the variance of a product of individual machines whereby the quality of the output of each machine may be ascertained thereby.

Still another object of this invention is to provide management personnel with sufficiently reliable production information whereby said personnel may accurately evaluate the overall efficiency of the control of a process and properly regulate said process in a more efficient manner.

These and other objects of the present invention will become apparent from the following detailed description taken in conjunction with the accompanying drawings in which:

FIGURE 1 is a simplified block diagram of the present invention showing only the major elements comprising the instant quality and production control system;

FIGURE 2 is a complete block diagram of the present invention showing all of the elements comprising the instant quality and production control system;

FIGURE 5a is a schematic diagram of the control means for manually initiating operation of a switching device of the type shown in FIGURE 5;

FIGURE 8 is a schematic diagram in block showing the data readout system of the production data center of FIG. 1; and FIGURE 9 is a pictorial display of the readout device of the present invention.

Figure 3:
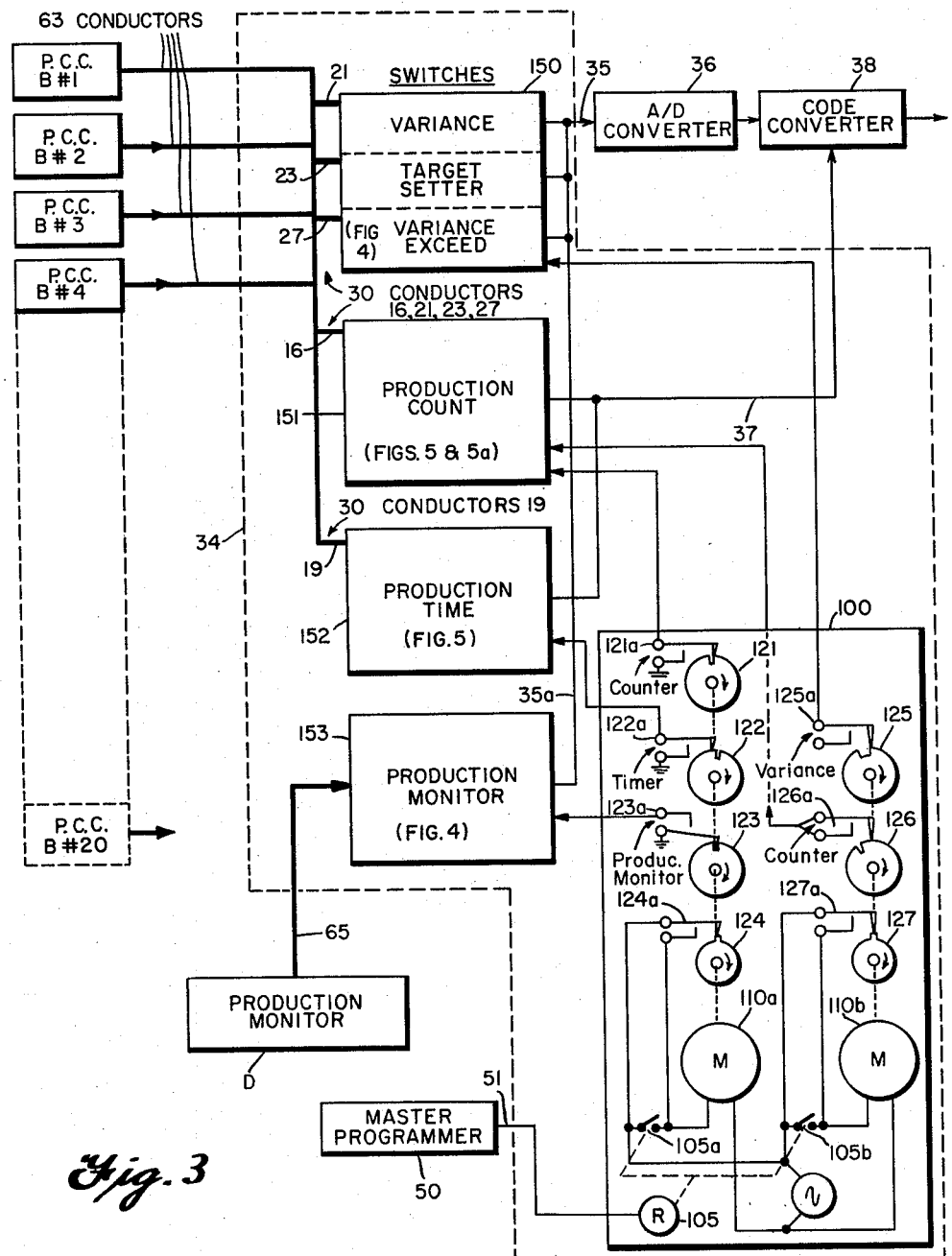
FIGURE 3 is a block diagram of the input multiplexer of the production data center comprising a major component of the present invention.

The present quality and production control system as shown in FIGURES 1 and 2 includes a process controller section A, at least one process control center B, a production data center C, and a production monitor D.

In FIGURE 1, the block diagram shows the major elements of the present system. These elements include a plurality of gauge controllers 10 comprising process controller section A; a multiplexer 20 and a variance computer 25 of each process control center B; a computer 40 and a master programmer 50 of production data center C; and a production monitor D. These elements as well as the operation thereof are more fully described later herein.

With particular reference to FIGURE 2, gauge-controllers $10a-n$ are individually mounted respectively to specific cigarette making machines (not shown) and are operatively responsive to variations of the amount of tobacco per unit length of the cigarette rod emanating from the machine. An illustration of the cigarette making machine is omitted here for those skilled in the art are well aware of its design. Each gauge controller 10 continuously measures the weight per unit length of the cigarette rod and emits an analog voltage proportional to this instantaneous weight measurement. This voltage signal is transmitted to the process control center B via cables $11a-n$. Moreover, this voltage is also compared with a reference voltage, the difference therebetween representing an error voltage which is applied to the input terminals of a servomechanical device (not shown) operatively connected to the cigarette making machine to regulate the rate of flow of tobacco being used to form the cigarette rod. The polarity of this error voltage dictates the relative change in rate of tobacco flow and concurrently results in reducing this same error voltage substantially to zero. A well known characteristic inherent in such a gauge controller is the production of cigarettes having a normal weight distribution about some mean weight. The gauge controller as used in this system is also the subject matter of U.S. application Serial No. 641,414, filed February 20, 1957, by Philip Spergel and Sidney A. Radley, now Patent No. 2,955,206.

A desired mean weight of the cigarette rod on a per unit length basis is manually set in controllers $10a-n$ by means of target setters $12a-n$, one each being provided for each controller. This setting establishes the reference point about which the associated controller operates to regulate the flow of tobacco so that the actual mean weight of the cigarette rod emanating from the respective cigarette making machine is substantially the desired mean weight. Additionally, an analog voltage proportional to the desired mean weight per unit length of cigarette rod is available at the output terminals of each target setter $12a-n$. This analog voltage is also transmitted to the process control center B, by lines $13a-n$.

Unit pulsers 14a–n and process sensors 16a–n are also associated with each gauge-controller 10a–n respectively. Each unit pulser 14a–n is essentially a switch operable at a frequency proportional to the number of cigarettes being produced; more specifically, it is a switch actuated by the cutting wheel of the cigarette making machine to provide a pulse generated upon switch closure each time the cutter wheel cuts off a cigarette from the continuous cigarette rod emanating from the cigarette making machine. Other unit pulsers can also be used in this system to perform this function, e.g., a photoelectric device, responsively operated each time a cigarette passes a certain point in the process, such devices all coming within the intended scope of this invention. In U.S. application Serial No. 707,035, filed by Walker B. Lowman on January 3, 1958, now Patent No. 2,999,520, such a suitable unit pulser is disclosed.

Process sensors 16a–n of the type disclosed in U.S. application Serial No. 641,357, filed February 20, 1957, by Sidney A. Radley, now Patent No. 2,954,775, are provided to allow passage of the pulses generated by the associated unit pulser 14a–n only when the cigarette making machine is actually manufacturing cigarettes. All other pulses emitted by the unit pulsers 14a–n, for whatever reason other than actual productive operation, are therefore rejected. Thus the process sensors 16a–n assure not only a reliable count of cigarettes produced by the respective cigarette making machine but also an accurate record of production time expended in the manufacture thereof.

With continued reference to FIG. 2, each process control center B includes production counters 17a–n and production timers 18a–n. The above-described pulses emanating from the unit pulsers 14a–n drive the respective production counters 17a–n; the corresponding process sensor 16a–n actuates the associated production timer 18a–n for recording only actual productive time of the respective cigarette making machine. In most cases, a conventional mechanical counter with a decimal switch readout in addition to the standard visual readout will have sufficient speed for similar applications of this system. For higher speed counting in a system as exemplified herein, an electronic counter capable of counting pulses upwards to 100,000 per second and of transferring the state of the counter into an associated storage register for subsequent readout purposes without interfering with the counting function is preferred. A counter of this type is a product of Di-An Controls, Inc., of Boston, Mass.

Production timers 18a–n are similar to production counters 17a–n. Only when the cigarette making machine is actually manufacturing cigarettes is the associated pulse sensor 16a–n actuated whereby pulses at some constant rate are applied to the respective production timer 18a–n. Thus, the count recorded is indicative of actual time of productive operation. Here, again, the state of each production timer 18a–n is transferred to an associated storage register in accordance with a programmed sequence to be described. As in the production counters 17a–n, provisions are also incorporated in production timers 18a–n whereby a decimally coded voltage readout signal is available for subsequent quantitative analysis at the production data center C.

The process control center B also includes a multiplexer 20, a programmer 28, a variance computer 25, a variance limit detector 22, a variance limit setter 24, a variance limit alarm 26, and a typewriter 32 for printing out a Cigarette Making Machine Variance Report 30. Each of the above components is described infra, and subsequently, each is incorporated in the description on the operation of the overall system of the present invention.

Multiplexer 20 is the termination point of cables 11a–n over which the analog voltages indicative of the instantaneous weight and the desired mean weight, both on a per unit length basis of the cigarette rod produced by the respective cigarette making machine, are received from each gauge controller 10a–n and its associated target setter 12a–n respectively. Essentially, multiplexer 20 is a conventional multi-level, rotary stepping switch for sequentially switching one of the output signals from process controller section A and applying same to the input of the process control center B. More specifically, the analog voltages available at each of the input terminals of the multiplexer 20 are selectively transferred to the output terminals thereof, the analog voltage indicative of the instantaneous weight per unit length of cigarette rod being applied at the input of variance computer 25 and the analog voltage indicative of desired mean weight per unit length of cigarette rod being applied directly to the input multiplexer of production data center C. Multiplexer 20 is operatively responsive to command signals received from programmer 28 and, upon receiving, such a command, is actuated to connect another set of input signals to the variance computer 25 and the production data center C. Each subsequent command signal then connects the output terminals of the multiplexer 20 to a successively different input terminal set thereof.

The variance computer 25 is an analog computer capable of calculating the variance of the instantaneous weight signal from each gauge controller 10a–n. By definition, variance is the square of the standard deviation of the variation in signal about the mean. The electrical analog of variance over a time interval T is well known to be $$(1) \qquad \sigma^2 = \frac{1}{T}\int_0^T e^2 dt - \left(\frac{1}{T}\int_0^T e\, dt\right)^2$$

where $e$ represents the instantaneous value of the electrical signal representing, in this system, the instantaneous weight measurements per unit length of the cigarette rod and $t$ represents time. Thus, as seen from the equation above, the output signal of the variance computer 25 is basically a D.C. voltage proportional to the time average of the variance. The variance computer 25 preferred herein is also the subject matter of U.S. application Serial No. 668,935, filed July 1, 1957, by Sidney A. Radley, now Patent No. 2,965,300.

A nominal two (2) minute time interval has been selected in the present system, this interval being determined by programmer 28 which actuates multiplexer 20 at this desired rate. For other applications of this system, a different time interval may be desired, and such intervals are readily incorporated in the system by appropriate changes in the programming equipment which includes, among others, programmer 28.

The variance limit detector 22 is essentially a voltage comparator unit operatively connected to the instant system by commands also received from programmer 28 at preset time intervals. More specifically, at the end of the previously mentioned two (2) minute time interval, programmer 28 switches the voltage output of the variance computer 25 representing the aforementioned time average of the variance to the variance limit detector 22 for comparison with a predetermined reference voltage, which is analogous to a variance limit goal, from limit setter 24. Should this reference voltage be exceeded two events occur. Firstly, the variance limit alarm 26 is energized and accordingly actuates suitable alarm devices such as lights, bells, or any other appropriate alarm signal incorporated therein. Secondly, a pulse is transmitted via line 27 to the production data center C for purposes to be more fully described later herein.

Thus, the important function of immediately notifying operating personnel when a particular cigarette making machine is producing a product with variance larger than allowable is accomplished automatically by the process control center B.

The frequency with which variance is computed and compared with a variance limit goal is dependent upon the time interval over which the variance is computed as determined, necessarily, by the number of cigarette making machines feeding information hourly into each process control center B. In some industrial applications, for example, the time interval may of necessity have to be increased and the number of processing units decreased; in others, the opposite may be true. In general, however, the combination finally determined will naturally affect the statistical reliability of the data developed since these factors necessarily determine the period of time which has elapsed since the previous variant measurement was taken for any specific processing unit.

Variance limit setter 24 provides the means for presetting specific reference voltages, analogous to a desired variance limit goal, for each gauge controller 10a–n. Concurrent with the switching of the variance computer output to the variance limit detector 22 is the switching of the appropriate reference voltage thereto for subsequent comparison of these analog voltages for purposes described supra.

Programmer 28 commences a one hour cycle of operation responsive to signals received on line 29 from production data center C and, when so commencing, transmits command signals to multiplexer 20 and variance limit detector 22 to actuate these devices at the proper time. In this manner, a signal from a particularly gauge-controller 10a–n is fed to variance computer 25 and the output of the variance computer, computed during the prior two minute period, is fed to the variance limit detector 22 and compared therein with the reference voltage as preselected for that particular gauge-controller. Concomitantly with the feeding of any resultant variance exceed signal over line 27, a second signal from the target setter 12a–n associated with the same gauge-controller 10a–n is fed over line 23 to the production data center C at the input terminals of multiplexer 34. Any conventional timer of a type commercially available but having the proper capacity of ON-OFF operations can be used as programmer 28 in this system. Other functional equivalents can also be used, flexibility in programming being the criteria on which selection thereof is based.

Typewriter 32 located at process control center B is an automatic electric typewriter for printing out certain predetermined data comprising a "Making Machine Variance Report" 30. Both the statistical data and the operating instruction transmitted to typewriter 32 originate at the production data center C, the description thereof being included infra.

With continued reference to FIGURE 2, the production data center C includes an input multiplexer 34, an analog to digital converter 36, a code converter 38, a digital computer 40, an output multiplexer 48, a master programmer 50, and a typewriter 52 with an associated tape punch 54.

Multiplexer 34 is essentially a device for sequentially switching a plurality of inputs to either of two outputs. These input signals to multiplexer 34 consist of the following: (1) analog voltage signals on line 21 from the variance computer 25, (2) analog voltage signals on line 23 from target setters 12a–n passed singly through multiplexer 20, (3) n decimally coded voltage signals on multiconductor cable 16 respectively from production counters 17a–n, (4) n decimally coded voltage signals on multiconductor cable 19 respectively from production timers 18a–n, (5) a variance exceed signal on line 27 from variance limit detector 25 dependent upon certain prescribed conditions, and (6) analog voltage signals on line 25 from production monitor D.

The first five (5) of the above mentioned inputs to multiplexer 34 comprise the output signals from each process control center B, each such center comprising a possible thirty (30) gauge controllers. Thus, by incorporating provisions for twenty such process control centers B–1 to B–20, it follows that as many as six hundred (600) gauge controllers are connectable in the exemplified system. It is now obvious that a like number of cigarette making machines are thereby subjectable to the precise control of product quality.

It is realized that in certain industrial applications of this system, the timing and sequencing here selected are subjectable to changes to achieve the desired flexibility in programming and compatibility with existing means, methods or processes, as well as to assure the reliability of the information presented. The scope of the present invention, then, is not to be restricted in any way by the arbitrary choice of time and sequence; neither should the instant system impose restrictions relative to any specific number of cigarette making machines, or other processes which, as set forth herein, preferably comprise the whole or portion thereof.

Figure 4:
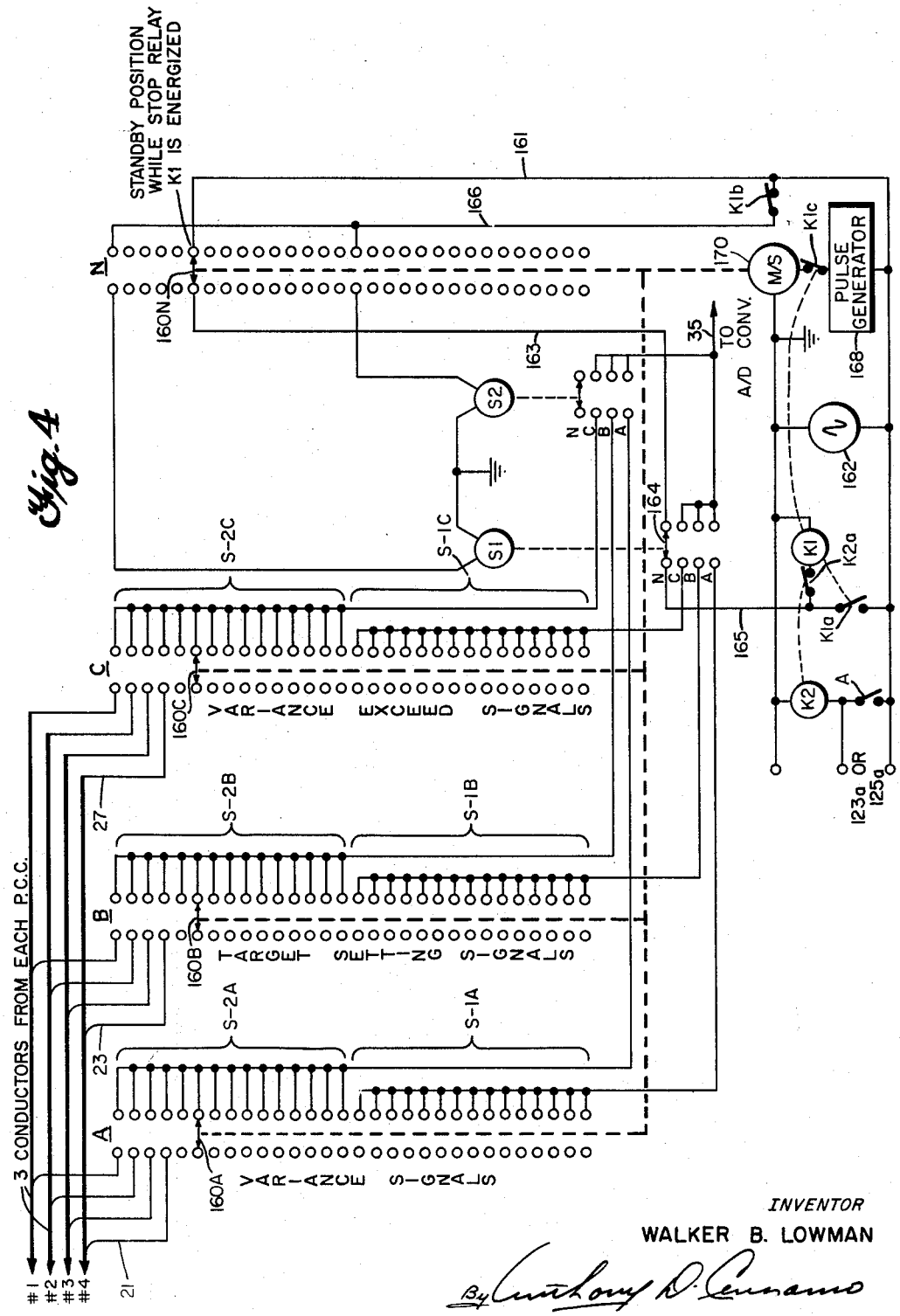
FIGURE 4 is a schematic diagram of one embodiment of the switching device incorporated in the input multiplier of FIGURE 3.
Figure 5:
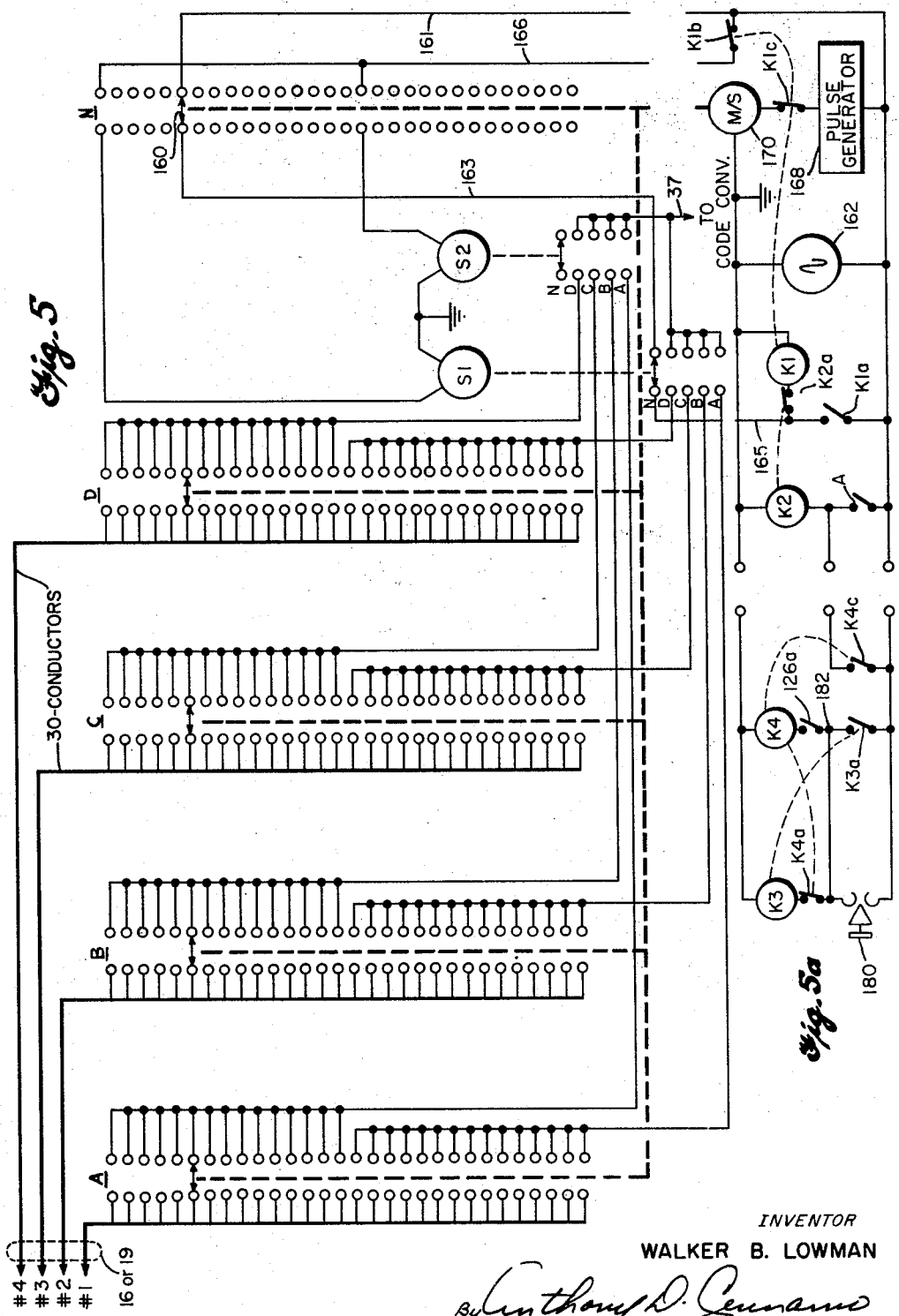
FIGURE 5 is a schematic diagram of another embodiment of the switching device incorporated in the input multiplexer of FIGURE 3.

Reference is next made to FIGURES 3, 4 and 5 wherein, it is seen, four (4) process control centers, B–1 to B–4, are terminated in a preferred manner. Again, the choice of only four (4) such centers is purely arbitrary and strictly for explanatory purposes.

Referring first to FIGURE 3, multiplexer 34 is shown in block diagram form and includes a conventional motor driven timer 100 and a plurality of switching devices 150–153 inclusive. In the instant arrangement, timer 100 initiates the operation of each switching device independently by effecting contact closure of the appropriate cam actuated switch. Once initiated, switching devices 150–153 each progresses through a definite operational cycle and, upon completing same, automatically reverts to standby status pending a subsequent like event to repeat the said cycle.

More specifically, timer 100 includes a timer relay 105 which is energized in response to a pulse received from master programmer 50. When so energized, the associated contacts 105a and 105b are closed momentarily, thereby completing the electrical circuit to timer motors 110a and 110b. A plurality of cams 121 to 124, as provided, is then rotatably driven by motor 110a at the rate of one revolution per hour; similarly, a plurality of cams 125 to 127 is rotatably driven by motor 110b at the rate of thirty (30) revolutions per hour. Cams 124 and 127 actuate contacts 124a and 127a which comprise holding circuits for motors 110a and 110b respectively, whereby same continue to rotate the above mentioned cams through 360 degrees of arc. It follows, then, that motors 110a and 110b operate continuously as long as pulses are received from master programmer 50 once every two (2) minutes. Other types of timers employing a plurality of cams, several of which by suitable gearing rotate at different angular speeds, are functionally equivalent to the instant timer, and, although alternative methods of control possibly would be required, the use of such means and methods is clearly intended to come within the scope of the present invention.

With continued reference to FIGURE 3, switching device 150 serves to sequentially transfer product information from each of the thirty process control centers pertaining to (1) the variance as computed by variance computer 25 of each process control center and present on the respective conductor 21, (2) the desired mean weight of the respective cigarette rod as present on the respective conductor 23, and (3) the variance exceed emitted by a respective limit detector 22 onto the associated one of lines 27 when the respective computed variance has exceeded the prescribed variance limit. This information, presented in analog form, is fed to analog-digital converter 36 over line 35 every two minutes in response to the closure of contacts 125a by cam 125 of timer 100. It will be noted that the variance exceed is a binary type signal that could be treated as a digital signal equally as well as an analog signal as in this instance.

Switching device 153, reference FIGURE 3, is similar to switching device 150 and serves to transfer a plurality of analog voltage signals received from production monitor D. These signals are indicative of desired goals and ratios as described more fully later herein. It suffices for the moment to point out that in the exemplified system seventeen (17) such signals are time shared and relayed once every hour to production data center C via analog to digital converter 36 by switching device 153 in response to the closure of contacts 123a by cam 123 of timer 100.

Switching devices 151 and 152, also shown in FIGURE 3, are likewise substantially similar to switching devices 150 and 153. Whereas the latter feeds the output thereof to analog-digital converter 36, the former bypass same and feed the output thereof directly to code converter 38 since both the production count and production time signals are in decimally coded voltage form. Both switching devices, 151 and 152, are automatically actuated hourly in response to the closure of contacts 121a and 122a, respectively, of timer 100.

An additional feature is provided whereby switching device 151 is actuated manually to read out the actual production count at any time intermediate the automatically presented hourly reports. By means of a suitable control circuit, shown in FIGURE 5a, management and operating personnel merely depress a switch which first transfers the status of each production counter 17a–n, reference FIGURE 2, to a storage register associated therewith, and then, in response to contact closure of contacts 126a by cam 126 of timer 100, transfers the information indicative of production count to production data center C for subsequent mathematical operation thereat and read-out purposes. Before describing this aspect of switching device 151, a complete description and mode of operation of switching device 150 is found below, followed by a comparative study of the distinguishing features between this and other switching devices, and closing with the above mentioned supplemental control circuit of switching device 151.

The schematic of switching device 150 is shown, reference FIGURE 4, to include a stop relay K–1 with normally-opened contacts K1a and normally-closed contacts K1b and K1c, start relay K–2 with normally-closed contacts K2a, contacts 125a of timer 100 as indicated generally at A, a multi-level rotary stepper henceforth referred to as master stepper 170, level selector steppers S–1 and S–2, an electrical voltage source 162, and a pulse generator 168 for actuating master stepper 170. Each of the other switching devices 151, 152, and 153 likewise includes these basic components and to this extent the following description applies equally thereto unless specific reference is made to the contrary. For this reason, then, contact A refers to the appropriate contact of timer 100 when reference is being made to a particular switching device, 150 to 153. More specifically, contact A shown in the schematic of FIGURE 4 refers either to contact 125a when switching device 150 is under contemplation, or to contact 123a when switching device 153 is being considered. Similarly, contact A shown in FIGURE 5 refers to contacts 121a and 122a when switching device 151 and 152 respectively are individually under consideration.

It should be pointed out that the basic difference between the schematics of FIGURES 4 and 5 is the method of terminating the various cables from each process control center. Either method may be used exclusively; and, dependent upon the number of gauge-controllers comprising the instant system, other methods of terminal connections to multiplexer 34 may be economically more feasible and yet still capable of satisfying future requirements, all these methods allegedly coming within the scope of the instant invention.

Reference is now made to FIGURES 4 and 5 wherein like reference notations are made to correspondingly similar elements at all occurrences. It is assumed, for the moment, that the moveable contacts or wipers 160 of master stepper 170 are presently disposed as shown in contact position six (6) of each level. Likewise, the wipers of level selector steppers S–1 and S–2 are assumed to be disposed in contact position N as shown. As such, an electrical voltage from source 162 is impressed across and hence energizes stop relay K–1 via a wire 161, wiper 160 of level N, a wire 163, wiper 164 of stepper S–1, a wire 165, and normally-closed contacts K2a of the presently de-energized start relay K–2. With stop relay K–1 so energized, contacts K1b and K1c are opened, the former disconnecting source 162 from contact positions 1 and 16 of level N and the latter disconnecting pulse generator 168 from the winding of master stepper 170. Moreover, contact K1a is closed concomitantly to complete a holding circuit for stop relay K–1 whereby same remains energized independently of any subsequent change in the contact position of wiper 160. It should be pointed out at this time that the disposition of the wipers as shown in FIGURES 4 and 5 and the operational state of the relays and the contacts associated therewith, as set forth above, are peculiar to each switching device, 150–153, upon each completing an operational cycle, and define the circuit conditions herein referred to as standby status.

To initiate a cycle of operation, timer 100 actuates the appropriate contacts, indicated generally at A, whereupon source 162 is impressed across start relay K–2 to energize same. Normally-closed contact K2a is thereby opened and stop relay K–1 is de-energized. Immediately, contacts K1b and K1c return to their normally-closed position and contact K1a to its normally-opened position. Master stepper 170 now commences to step at a prescribed rate as selectably determined by the frequency of pulses received thereat from pulse generator 168.

Upon advancing to the very first subsequent contact position, namely, contact position seven (7), stop relay K–1 can no longer be energized until wipers 160 and 164 advance through one complete cycle of operation and again attain the relative contact positions shown in FIGURES 4 and 5. Thus, the disposition of contacts K2a is without consequence so far as continued operation of master stepper 170 is concerned; however, it is necessary that contacts K2a be returned to the normally-closed position at some time prior to wipers 160 and 164 attaining the relative position shown in FIGURES 4 and 5 in order to complete the electrical path to stop relay K–1 and, upon energizing same, disconnect the pulse generator 168 from the winding of master stepper 170 to terminate the operation thereof. Therefore, contacts A are preferably closed at the proper time and only for a duration long enough to initiate the operation of each switching device.

With continued reference to FIGURES 4 and 5, it should be noted that level selector steppers S–1 and S–2 are advanced one contact position each time wiper 160 passes through contact positions 1 and 16 respectively. It has been pointed out that contact K1b is disposed in its normally-closed contact position during the operational cycle of the switching device and as such connects source 162 to one side of contacts 1 and 16 of level D.

Since each level selector stepper is advanced one contact position each time wiper 160 completes one revolution, it follows, then, that a like number of revolutions of wiper 160 as there are contact positions of either level selector stepper S–1 or S–2 define one operational cycle of the particular switching device. Thus, in switching device 150 as shown in FIGURE 4, wiper 160 steps a total of four (4) complete revolutions, the equivalent of one hundred twenty (120) steps. Similarly, in switching devices 151 and 152 as shown in FIGURE 5, wiper 160 steps a total of five (5) complete revolutions, the equivalent here of one hundred fifty (150) steps. Note, only four process control centers are shown in this example, each center being terminated at a separate level of contacts. Thus, for twenty (20) process control centers, twenty (20) such levels would be required plus another level for purposes of switching the level selector steppers and of terminating the operation of the switching device upon wiper 160 completing twenty-one (21) complete revolutions or the equivalent of six hundred thirty (630) steps.

With respect to switching device 153, it has been pointed out that seventeen (17) input signals are to be sequentially transferred to product data center C. This number of signals requires only one level of contacts connected at the input as shown in FIGURE 5 and to the output as shown in FIGURE 4. In this switching device, wiper 160 steps a total of two (2) complete revolutions or the equivalent of sixty (60) steps.

The preferred method of terminating the various leads originating at the output of each process control center is clearly shown in FIGURES 4 and 5. It should be noted in FIGURES 2 and 4 that wires 21, 23, and 27 from process control center B-1 are terminated at one side of contact terminal one (1) of levels A, B, and C respectively. Similarly, the same wires from process control center B-2 are terminated at the next contact terminal in like manner. The same follows for all other process control centers feeding information to production data center C. Thus, in switching device 150, all variance signals are available at level A, all target setting signals at level B, and all variance exceed signals, whenever emitted, at level C.

Referring now to FIGURE 5, all production counters 17a–n of each process control center B-1, B-2, etc., are connected to switching device 151 by a respective cable 16. By connecting said cable in this preferred manner, each process control center is thereby terminated at a particular level—for example, B-1 to level A, B-2 to level B, etc.—and each production counter 17a–n at a specific contact terminal of that level, preferably in numerical sequence. Thus, production counter 17a of process control center B-1 is terminated at contact terminal 1 of level A of switching device 151. Likewise, the corresponding production counter of process control center B-2 is terminated at contact terminal 1 of level B, etc.

The termination of all production timers 18a–n at switching device 152 is accomplished in the same way as described directly above and shown in FIGURE 5. In this case, cable 19 provides the path for the decimally coded voltage signals being fed to production data center C.

A cable 65, reference FIGURES 2 and 3, provides the electrical path for the aforesaid seventeen (17) analog voltage signals indicative of desired goals and ratios as set in the system at production monitor D. The termination point of cable 65 is a level A of switching device 153.

With continued reference to FIGURES 4 and 5, it should be noted that the other side of the contact terminals of each level A, B, C, etc., with the sole exception of the control level N, is commonly connected to form two groups. Contact terminals 1–15 of level A are commonly connected to contact terminal A of level selector stepper S-2 and, thus, is referred to as contact group S-2A. Similarly, the same contact terminals of level B are connected to contact terminal B of level selector stepper S-2, and hence, the notation used is S-2B. Thus, contact group S-1A, for example, refers to the group of contact terminals, 16 through 30, of level A and further indicates that this group is terminated at contact terminal A of level selector stepper S-1. This method of notation will greatly facilitate an understanding of the sequence followed in the operation of level selector steppers S-1 and S-2 as master stepper 170 progresses through a cycle of operation.

Figure 6:
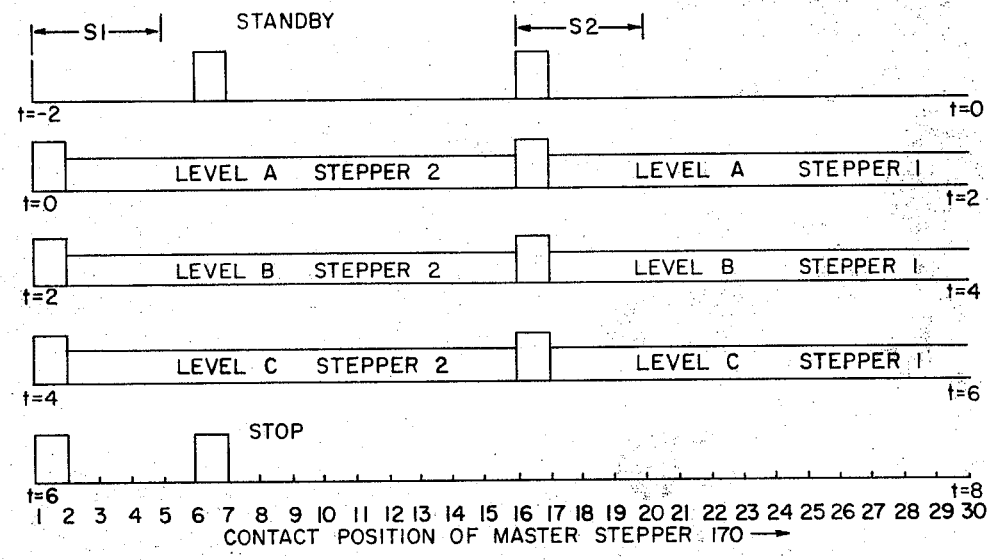
FIGURE 6 is a bar diagram for depicting the sequence of operation through which the switching devices of FIGURES 4 and 5 progress.

FIGURE 6 is a graphical description of a cycle of operation of switching device 150 as shown in complete schematic form in FIGURE 4. Naturally, this graphical description can be expanded mentally to include an explanation of the operative cycle of switching devices 151 to 153.

Upon actuating switching device 150, master stepper 170 commences to step at the preferred rate of 15 steps per second and advances from contact position six (6) clearly shown in FIGURE 6 as standby position. When wiper 160 reaches contact position 16, level selector stepper S-2 advances to contact position A. At this time, none of the input signals to switching device 150 is being transferred to analog-digital converter 36. As wiper 160 reaches contact position 1, level selector stepper S-1 advances to contact position A. Concomitantly, and for the next fifteen steps, wiper 160-A is transferring all signals at said preferred rate to contact group S-2A and hence to analog-digital converter 36. Subsequently, wiper 160 reaches contact position 16 for the second time and accordingly causes level selector stepper S-2 to advance to contact position B. In like fashion, wiper 160A is now sequentially transferring those signals present at any of the contact terminals 16 through 30 to contact group S-1A and henceforth to analog-digital converter 36. During the next two (2) seconds, wiper 160B sequentially transfers all signals available at level B, the first fifteen to contact group S-2B and the second fifteen to contact group S-1B. Level selector steppers S-1 and S-2 are again advanced one contact position when wiper 160 passes through contact positions 1 and 16 respectively. In alike manner, wiper 160C transfers all signals available at level C as selected by the positioning of level selector steppers S-1 and S-2 in contact position C during the third two second interval. As wiper 160 passes through contact position 16 for the fourth time, level selector stepper S-2 advances to contact position N. One second or fifteen steps later, wiper 160 reaches contact position one (1) for the fourth time and level selector stepper S-1 advances whereby its wiper 164 is disposed in contact position N to complete a portion of the electrical circuit to stop relay K-1. Master stepper continues to step and upon wiper 160 reaching contact position six (6), the electrical path to stop relay K-1 is completed. Stop relay K-1 is now energized and terminates the operation of switching device 150. It should be emphasized that the selection of contact position six (6) is arbitrary, the restriction here being that the choice, if other than contact position six (6), fall between contact positions two (2) and fourteen (14) inclusive. It should be clear that a choice not within this restriction will result in faulty operation of switching devices 150–153.

Reference is next made to FIGURE 5a wherein is shown a suitable control circuit for manually initiating operation of switching device 151 of multiplexer 34. Thus management and operating personnel are provided with the means whereby the actual production count of a product—in this example, cigarettes—can be interrogated at any time during the hour and transferred to the production data center C for subsequent readout purposes during identical intervals reserved for this purpose in the remaining twenty-nine (29) norminal two minute time periods as conveniently shown in FIG. 7.

Upon depressing a conventional momentary type switch 180, reference FIGURE 5a, source 162 energizes a memory relay K-3 through the normally-closed contacts K4a of a manual start relay K-4. A holding circuit comprising normally-opened contacts K3a is thereby completed and memory relay K-3 remains energized until manual start relay K-4 is subsequently energized. Upon closure of contacts 126a of timer 100, manual start relay K-4 is thereby energized, and normally-opened contacts K4c, associated therewith and in parallel circuit relationship with the contacts A of FIGURE 5, is closed to energize start relay K-2 of switching device 151 whereby same commences a cycle of operation. Concomitantly, memory relay K-3 is de-energized by the opening of normally-closed contacts K4a. Contact K3a is now returned to its normally-opened position after an elapse of time sufficient to assure the energization of start relay K-2. It follows, then, that manual start relay K-4 is subsequently de-energized by the delayed opening of contacts K3a; henceforth, the opening of contacts 126a serves no specific purpose but is preferably opened nonetheless for the remainder of the nominal two minute interval.

Figure 7:
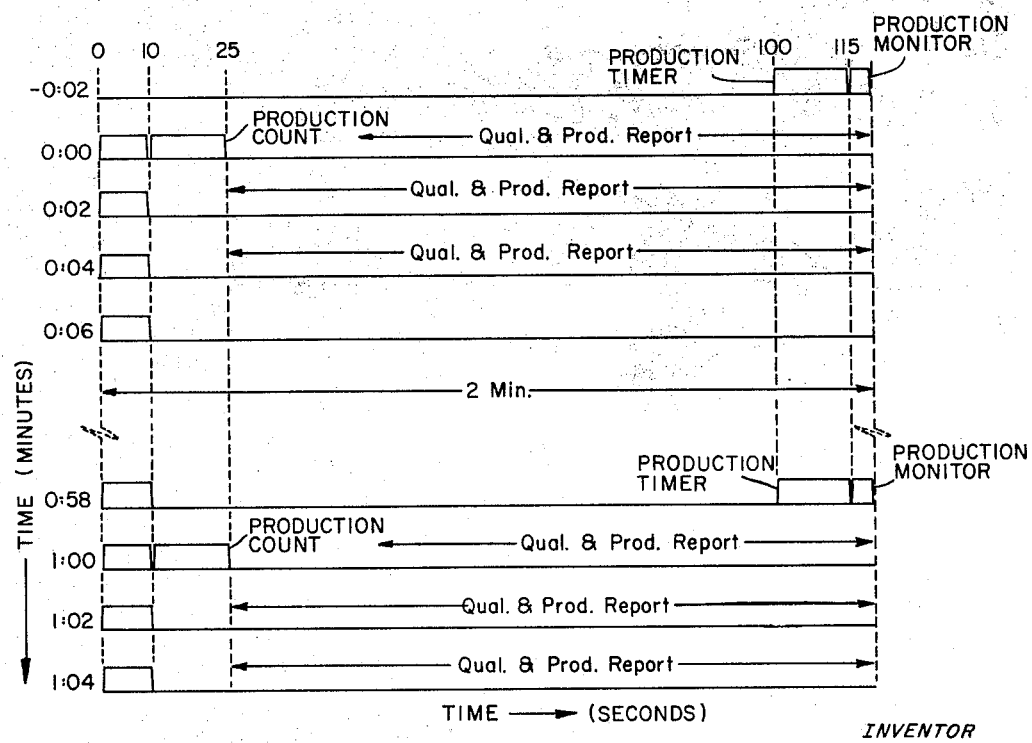
FIGURE 7 is a bar diagram for graphically describing the operational sequence of the quality and production control system of the present invention.

It should be understood that cam 126, reference FIGURE 3, effects closure of contacts 126a once every two minutes at some precise instant, preferably ten (10) seconds after zero time reference of the two minute interval. The preferred configuration of cam 126 is seen to include a detent disposed along the periphery thereof and to such an extent that contacts 126a is closed for a short time interval at the aforesaid precise instant. Moreover, FIGURE 7 clearly shows an interval of time, commencing at ten (10) and ending at twenty-five (25) seconds past zero reference, during which production count information is transferred to production data center C. Only those intervals used for transmission of the hourly information presented automatically are shown in FIGURE 7; all other like intervals are reserved for transmission of production count information in the event manual readout is initiated during the hour.

It has now been shown that manual start relay K-4 will initiate a cycle of operation of switching device 151 whenever switch 180 is depressed either at the aforesaid precise instant or at some instant within the two minute interval preceding said instant when contacts 126a are closed by cam 126 of timer 100. In the latter event, the depressing of switch 180 is recorded as the energized state of memory relay K-3 thereby partially completing the electrical path to manual start relay K-4 by closing contacts K3a. With the subsequent closing of contacts 126a of timer 100, it is seen that manual start relay K-4 is energized only at the above mentioned precise instant during any two minute interval and independently of the actual time of depressing switch 180.

Thus, it is seen that all signals, fed to multiplexer 34 and terminated thereat at one of switching devices 150–153, are transferred to production data center C at the proper time by closure of the appropriate cam actuated contacts of timer 100, which timer commences a cycle of operation in response to a signal received from master programmer 50. Moreover, multiplexer 34 receives a plurality of information signals and sequentially applies these signals at one of two output terminals for transfer to production data center C.

One of the output terminals of multiplexer 34, reference FIGURES 2 and 3, is connected by wire 35 to a single analog-digital converter 36 for converting each analog input signal in turn to its digital equivalent and thence transferring same to code converter 36. The other output terminal of multiplexer 34 by-passes analog-digital converter 36 and applies the decimally coded voltage signals via wire 37 directly to code converter 36 wherein all digital signals applied thereat are further converted to a particular digital code for subsequent transmission to digital computer 40 via wire 41. It should be pointed out that analog-digital converters are commercially available, any one of several types being equally applicable in the present system. A suitable analog-digital converter is the subject matter of co-pending application filed November 10, 1958, Serial No. 772,748, by Philip Spergel and Ko Hsin Liu. As to code converter 38, this device is generally specified and/or furnished by the manufacturer of the digital computer into which the output signals of said code converter are fed.

Digital computer 40 is composed substantially of three basic units, namely, an arithmetic unit 42, an information storage or memory unit 44, and a control unit 46. The arithmetic unit 42 performs all of the mathematical operations as scheduled by control unit 46. The memory unit 44, also scheduled by control unit 46, stores information for subsequent delivery to arithmetic unit 42 or transmission to certain external components in the system for either readout or command purposes. Any further description of the mechanics of digital computers is unnecessary since such descriptions are readily found in the literature. As to the methods of programming and operating digital computers, the manufacturers thereof generally prescribe certain recommended procedures to be followed and, for this reason, this aspect of the description is also omitted. Included, however, are the specific operational requirements which this particular industrial application requires digital computer 40 to perform. It is these requirements which form the basis for selection of the digital computer to primarily one of sufficient capacity, especially as to storage capacity. These operational requirements relating to the cigarette industry, as exemplified herein, are subsequently discussed concurrently with the description covering the operation of the overall system.

The output of digital computer 40 is fed to multiplexer 48 which, upon receiving command signal from master programmer 50, selects the appropriate output equipment for presentation of the information transmitted thereto. Multiplexer 48 is substantially the equivalent of multiplexer 34 with the exception that the information originates from one source, namely, digital computer 40, and is distributed to a plurality of output circuits comprising typewriter 32 located at each process control center B, typewriter 52 associated with production data center C, and production monitor D.

Master programmer 50 co-ordinates the complex operation of the present system and synchronizes digital computer 40. Each of the following units of the system—namely, programmer 28 and typewriter 32 of each process control center B, and multiplexers 34 and 48 and typewriter 52 of production data center C—is operationally controlled by command signals emanating from master programmer 50. Essentially, master programmer 50 comprises conventional timers, steppers, and relays whereby these command signals are transmitted to the above said units at the proper time to actuate same accordingly in a prescribed sequence.

Typewriter 52, located at production data center C, is an automatic electric typewriter of the commercially available type similar to typewriter 32 and serves to print out certain predetermined data comprising a "Quality and Production Report" 60. A conventional tape punch 54 is also provided whereby the same information or selected portions thereof, fed to typewriter 52, is recorded concurrently on a tape 55 for subsequent programming of accounting machinery 56 and, as such, facilitates the preparation of financial reports 58 as shown in FIGURE 8.

With reference to FIGURES 1, 2 and 9, production monitor D is a readout device for presenting certain information relating to the quantity and the quality of the product produced, such information being subdivided and displayed accordingly to facilitate the interpretation thereof. The division itself is dependent upon the particular industry and the management and operation thereof. In the cigarette industry, the division is generally one based on lines and brands both. A line is defined, in the broadest sense, as a group of cigarette making machines. A brand is similarly defined as those machines making a particular type or name brand of cigarettes. In the event a particular brand is produced by cigarette making machines from more than one line, the information relating to that brand is compiled accordingly by computer 40 and presented to the appropriate readout component of said brand at production monitor D. In FIGURE 9, production monitor D is shown arranged in this preferred manner to receive and present the aforesaid information relating to quantity and quality of the product produced.

As set forth above, the information received by production monitor D relates to both quantity of production and quality of product, and both of these items of information are presented for each line and each brand. The presentation of this information accordingly is accomplished by actuating the proper light of each set of the two sets of lights provided for each line and each brand. This plurality of sets of lights is incorporated in ratio readout 62, shown in FIGURE 2 in block diagrammatic form as a component of production monitor D. In FIGURE 9, numerical reference to ratio readout 62 is not attempted in order to avoid confusion since the ratio readout 62, shown in block diagrammatic form in FIGURE 2, has been integrated in the preferred arrangement of production monitor D. It suffices to state that ratio readout 62 includes all the lights shown in FIGURE 9.

With continued reference to FIGURE 2, production monitor D is shown to also include a goal setter 64 comprising a plurality of precision potentiometers for inserting various reference voltages in computer 40. In FIGURE 9, reference to goal setter 64 is also excluded for clarity purposes. In this case, each of the potentiometers shown in FIGURE 9 comprises goal setter 64 as shown in the block diagram of FIGURE 2. The D.C. voltages proportional to the setting of these potentiometers are sequentially passed through multiplexer 34 by switching device 153 thereof, converted to the proper digital voltage by analog-digital converter 36 and code converter 38, and fed to computer 40 for either storage in memory unit 44 or operation thereon by arithmetic unit 42 as specified by control unit 46. A cable 65 is provided to convey these voltage signals to multiplexer 34.

In the instant example, a precision potentiometer is provided, as shown in FIGURE 9, for setting each of the following: (1) the production goal of each line and each brand, (2) the variance goal of each line and each brand, (3) the production ratio limit, (4) the variance ratio limit and (5) the overall variance goal for the system.

For explanatory purposes only, the present system arbitrarily comprises lines 1 through 5 and brands A and B as clearly shown in FIGURE 9. Thus, it is seen that seven (7) precision potentiometers are required to afford the setting of production goal, seven (7) more for the setting of variance goal, and one (1) each for the setting of production ratio, variance ratio, and overall variance goal respectively. In this example, then, seventeen (17) such potentiometers are required and a like number of analog voltages indicative of the respective settings is time shared by multiplexer 34 and transferred to production data center C. It should be clear that these potentiometers, comprising goal setter 64 of FIGURE 2 and incorporated in production monitor D as shown in FIGURE 9—these potentiometers are the means by which reference voltages are inserted in digital computer 40 for purposes yet to be described.

This completes the general description of the various components of the present invention. Up to this point, an operational description of these components has been purposely reserved for inclusion in the now to be discussed operation description of the entire system, starting with the signals emitted at the gauge-controller and including all subsequent events relating to said signals. Only in the description of multiplexer 34 was it felt that a detailed operational description was warranted. Therefore, subsequent references to multiplexer 34 in the following operational description shall be limited to its functional aspect of sequentially time-sharing a plurality of input signals to production data center C.

It is assumed for the purpose of this operational description that a cigarette rod is being produced by a cigarette making machine and that gauge controller 10a associated therewith is continuously emitting a voltage signal indicative of the instantaneous weight of said cigarette rod. Further, this signal has been applied through multiplexer 20 to variance computer 25 where- at the variance, a figure of merit indicating the distribution of product weight, of said signal is computed.

At the instant hereinafter referred to as zero time reference, master programmer 50 applies a command signal to programmer 28, multiplexers 34 and 48, and typewriter 32.

Programmer 28 in turn actuates both multiplexer 20 and conventional relay circuitry incorporated in variance computer 25 and variance limit detector 22. Multiplexer 20 now switches both the signal emitted by a second gauge controller 10b to variance computer 25 and the signal emitted by target setter 12a directly to multiplexer 34. Concomitantly, the output of variance computer 25 is applied to multiplexer 34 and to variance limit detector 22. At the latter, the computed variance is compared with appropriate reference voltage for gauge controller 10a, as preset in variance limit set 24.

In the event this variance voltage exceeds the appropriate reference voltage, as preset by conventional potentiometers or equivalent to bias conventional flip-flops incorporated in limit set 24, a variance exceed signal is emitted by variance limit detector 22 and applied to both multiplexer 34 and variance limit alarm 26. Immediately, then, conventional alarm devices are actuated to notify operating personnel that a substandard level of performance is presently occurring at that particular cigarette making machine. Henceforth, it is assumed that such a variance exceed signal is emitted by variance limit detector 22, for the purpose of this explanation.

Thus far, three signals are present at the input terminals of multiplexer 34. These signals are on conductors 21, 23, and 27, and respectively consist of (1) the computed variance of the signal emitted by gauge controller 10a, (2) the signal indicative of desired mean weight emitted by target setter 12a, and (3) the variance exceed signal presented since the computed variance is assumed to exceed the appropriate preset variance limit.

Multiplexer 34, in response to the aforesaid command signal received over line 51 in FIGURES 2 and 3 from master programmer 50 at zero time reference, closes its switch contacts 125a to energize switch 150 and thereby sequentially transfers these three analog voltage signals of each process control center B via the FIGURE 4 circuitry, during the first six seconds of each two minute interval in FIGURE 7, to analog-digital converter 36 for subsequent transfer to code converter 38 and thence to digital computer 40.

At digital computer 40, the variance signal from each analog computer 25 is both stored in memory unit 44 and applied, through multiplexer 48, to typewriter 32. Similarly, the target setter signal and the variance exceed signal are each stored in memory unit 44 for subsequent computations and ultimate presentation to typewriter 52 for printing out a "Quality and Production Report" 60.

Typewriter 32, in response to the command signal received from master programmer 50 at zero time reference, prints out this variance information on a "Variance Report" 30 during the first ten seconds of each two minute interval in FIGURE 7. Moreover, at this instant, this variance information is printed with red ink since a variance exceed signal has been received by digital computer 40. Otherwise, the "Variance Report" 30 is printed in black. Thus, the readability of this report is substantially improved, and the detection of substandard performances is greatly facilitated.

The above described events take place while the cam switch contacts 125a in FIGURE 3 remain closed, which is during the first 10 seconds of each two minute interval as best seen in FIGURE 7. During the next fifteen (15) seconds, information relative to production count is fed to digital computer 40 via switching device 151 in FIGURE 3. Although presented automatically only once each hour, preferably on the hour, this production count information is readily available throughout the hour by manual actuation of the control circuit shown in FIGURE 5a and described previously herein. Thus, the fifteen (15) second time interval, reference FIGURE 7, commencing ten (10) seconds after zero time reference and for each succeeding two minute interval, is reserved for this purpose only in this, the preferred embodiment.

Each hour, at zero time reference, production counters 17a–n receive a signal from programmer 28. The state of each production counter is immediately transferred to its associated storage unit (not shown), the output of each being terminated at switching device 151 of multiplexer 34. Reference is again made to Di-An Controls, Inc., of Boston, Mass., who manufacture and sell a counter suitable for this purpose.

At ten (10) seconds past zero time reference, switching device 151 is actuated by the closure of timed contacts 121a and thereupon commences to transfer, in sequence, these decimally coded voltage signals from production counters 17a–n. It should be noted that multiplexer 34, in response to the previously mentioned command signal received from master programmer 50 at zero time reference, is presently progressing through a definite cycle of operation as previously described. These signals from production counters 17a–n are time-shared at the input of code converter 38 and converted thereat to the required digital code for subsequent insertion in digital computer 40. Here, the count of each production counter is stored in memory unit 44. Moreover, arithmetic unit 42 totalizes the count from those counters which comprise a line or a brand, and these summaries are also stored separately in memory unit 44 pending further uses. These computer operations are all co-ordinated by control unit 46.

Similarly, as best seen in FIGURE 7, information relative to production time is inserted hourly in the system preferably just prior to zero time reference as determined by the notch in cam 122 in FIGURE 3. Again, programmer 28 causes the state of production timers 18a–n to be transferred to each storage register (not shown) associated therewith, the outputs thereof being terminated at switching device 152 of multiplexer 34. And similarly, upon closure of the proper contacts of timer 100, contacts 122a in FIGURE 3, this information is sequentially transferred to code converter 38 and thence to digital computer 40. Arithmetic unit 42, in response to control unit 46, totalizes the production time on a line, brand, and overall bases whereupon these summaries are individually stored in memeory unit 44 pending the printing of "Quality and Production Report" 60.

It is also seen in FIGURE 7 that information relative to variance and production goals and ratios is inserted hourly in the system, preferably during the five (5) seconds preceding zero time reference as determined by the position of the notch in cam 123. More specifically, the information on production time is inserted preferably during the fifteen (15) seconds preceding the insertion of this information from production monitor D. Thus, management is afforded the means to make the changes they deem necessary any time during the hour preceding the presentation of the hourly "Quality and Production Report" 60 which, it will be seen, commences to be printed following the hourly insertion of production count information, as shown in FIGURE 7.

As previously pointed out, these analog voltages from Production Monitor D are terminated at switching device 153 of multiplexer 34 and are sequentially transferred therethrough upon the closure of timed switch contacts 123a, properly digitized by converter 38, and eventually stored in digital computer 40. Control unit 46 accordingly withdraws these reference data from memory unit 44 and passes same to arithmetic unit 42 whereat prescribed mathematical relationships are computed and thence delivered to the proper external read-out equipment.

This completes the operational description of the present invention so far as the insertion of data in digital computer 40 is concerned. It should now be apparent that information relative to (1) the distribution of product weight, by way of computed variance signals on line 21, (2) the desired mean weight, by way of set target signals on line 23, and (3) the occurrence of substandard performance, by way of variance exceed signals on line 27, all for each of twenty different cigarette making machines which are respectively in a different process control center B, is presented every two minutes during the first ten (10) second interval thereof. It should also be apparent that twenty (20) such process control centers are connectable in the system, and that the above information is received concomitantly from each process control center and time-shared to production data center C by multiplexer 34. That is, considering the thirty different gauge controller and making machine combination for each of the twenty process control centers B to be designated A1–A30, it is apparent that during the first ten seconds of the first two minute interval 0:00–0:02 in FIGURE 7, the above enumerated items of information are read out from only the twenty combinations designated A1; then, during the first ten seconds of the second two minute interval 0:02–0:04, such items of information are read out from the next twenty combinations A2; etc., until during the 30th two minute interval 0:58–0:60 at the end of the hour, such information is read out from each of the last twenty combinations A30 respectively from the twenty process control centers B. Also apparent should be the means for inserting the hourly information relative to (1) production count, (2) production time, and (3) reference data from production monitor D, which data comprise (a) production goal, (b) variance goal, (c) production ratio limit, (d) variance ratio limit, and (e) overall variance goal for the system.

The preceding paragraph sets forth the novel method and means by which the present invention automatically accumulates the information necessary for effective quality, maintenance, and production control of a plurality of processing machines comprising a factory automation system. Once accumulated, this information requires summarizing and presenting in a concise convenient form. Digital computer 40 perfects the summarizing requirements. As to the presentation, typewriter 32 of each process control center and typewriter 52 of production data center C print out the "Variance Report" 30 and the "Quality and Production Report" 60 respectively. Moreover, certain information is presented to production monitor D for display (readout) purposes. It should be clear that the source of all the information presented is digital computer 40 and that this information is accordingly switched to the appropriate read-out equipment by multiplexer 48 in response to signals received from master programmer 50.

Confining our attention first to the "Variance Report" 30, it is recalled that the variance is typed out on this report immediately upon being computed. In the event a preset variance limit is exceeded, the variance is printed in red. Thus, typewriter 32 records a computed variance value once every two (2) minutes, respectively for the thirty machines once per hour, throughout a normal eight (8) hour shift. At the end of said shift, each typewriter 32 prints out information relating to (1) the average variance for each cigarette making machine, (2) production goal in thousands of cigarettes for each cigarette making machine, (3) actual production in thousands of cigarettes produced by each cigarette making machine and (4) the ratio of actual production to production goal for each cigarette making machine. Thus, the requirements of digital computer 40 are defined so far as the "Variance Report" 30 is concerned.

It is recalled that the variance of each cigarette making machine is stored in memory unit 44 of digital computer 40. Such storage is preferably made in accumulative form and a record made of the number of variance values comprising this total. Thus, the average variance is obtained by the mathematic process of division and, having been obtained in some convenient sequence, is applied in that sequence to typewriter 32.

The production goal for each cigarette making machine is obtained from the production goal information submitted by production monitor D. Hence, the production goal for line 1, for example, is the production goal for all cigarette making machines included in line 1. The same is true for variance goal. Thus, control unit 46 withdraws the appropriate goals from memory unit 44 and feeds same in the proper sequence to typewriter 32 for inclusion in "Variance Report" 30.

The actual production count is likewise available and transmitted to typewriter 32. As to the ratio of actual production and production goal, this comparison is made by arithmetic unit 42 and subsequently incorporated in "Variance Report" 30.

It should be pointed out that the variance goal is included in "Variance Report" 30, preferably as the first entry under which succeeding entries of computed variance are columnated, once each hour. Moreover, it should be also pointed out that a "Variance Report" 30 is being formulated throughout the regular shift period at each process control center.

As a summary recapture of the workings of master programmer 50 and each of the process control center programmers 28 and as a prelude to the description of making a "Quality and Producting Report" 60, consider the following to affix timing aspects better in mind.

During the first ten seconds of every two minute period in FIGURE 7:

(1) Programmer 28 steps respective multiplexer 20 to next position to receive signals from the next controller and last target setter (e.g. from controller 10b and target setter 12a);

(2) Programmer 28 actuates variance computer 25 to effect readout, of variance computed on signal from last controller (e.g. controller 10a) during prior two minute period, to multiplexer 34 and to limit detector 22;

(3) Programmer 28 actuates limit detector 22 to cause comparison of that computed variance with corresponding reference voltage from limit set 24;

(4) Master programmer 50 synchronizes the computer control unit 46 to keep the computer and all other operations in step;

(5) Master programmer 50 actuates multiplexer 34 (by re-energizing relay 105 of FIGURE 3, so motors 110a and 110b will continue to run) to transfer from each of the twenty process control centers B through to computer memory unit 44 and multiplexer 48, (a) the computed variance signals on input lines 21, (b) the mean weight (target setter) signals on input lines 23, (c) any variance exceed signals on input lines 27;

(6) Master programmer 50 actuates multiplexer 48 to start a readout cycle to distribute the so transferred signals to the proper one of the twenty typewriters 32; and (7) Master programmer 50 actuates each of the twenty typewriters 32 to synchronize operation thereof with multiplexer 48 to effect a "Variance Report" at the respective process control center B.

Furthermore, at the beginning of each hour, master programmer 50 initially actuates:

(1) All twenty programmers 28 to start them on a 1 hour cycle, (2) All twenty typewriters 32 to start them operating;

(3) Multiplexers 34 and 48 also to start them operating; and (4) Computer 40 to synchronize control unit 46.

At this same time, i.e., at the beginning of each hour, as soon as the master programmer has started them, each programmer 28:

(1) Executes the three items listed above under the two minute operations, and (2) Actuates the thirty production counters 17a–n to cause readout thereof into respective internal storage units (not shown) the outputs of which terminate via lines 16 at the production count switching device 151 (FIG. 3) of multiplexer 34. (These outputs are read through device 151 when cam switch contacts 121a close for 15 seconds beginning at ten seconds past the beginning of each two minute period.)

Each programmer 28 has the further duty, at 58 minutes 90 seconds through each hour, of actuating the 30 production timers 18a–n to cause readout thereof into respective internal storage registers (not shown) the outputs of which terminate via lines 19 at the production time switching device 152 (FIG. 3) of multiplexer 34. (These outputs are read through device 152 when cam switch contacts 122a close for 15 seconds at time 58:100.)

The "Quality and Production Report" 60, on the other hand, is printed out hourly by typewriter 52, and includes (1) variance information relating to quality of product, (2) production information relating to quantity of product, (3) information relating to the amount of raw materials used and (4) maintenance information relating to both production time and performance levels. Moreover, the above items of information are presented for each line and each brand as well as for the overall system.

Master programmer 50 and control unit 46 cooperate to present the proper information at the proper time to typewriter 52 for printing out "Quality and Production Report" 60 during those time intervals preferably reserved for this purpose as shown in FIGURE 7. In this way, digital computer 40 continues to receive information which will be subsequently included in the next "Quality and Production Report" 60.

Preferably the format of the "Quality and Production Report" 60 consists of a line entry each including the above item of information for each particular line of cigarette making machines. More specifically, the variance information presented in this report includes the variance goal, the average variance, and the ratio of goal to average in that order from left to right across the page. Further, the production information, which then follows, similarly includes the production goal, the actual production, and the ratio of actual to goal. Finally, the last three items of this line entry pertain to pounds of tobacco used, production time in minutes, and the number of cigarette making machines operating at substandard levels of performance.

This sequence is then repeated for each line of cigarette making machines. Preferably, those lines making the same brand of cigarettes are recorded successively and followed by a line entry containing similar information but summarized accordingly for that particular brand. In the instant example, it is recalled that five (5) lines of cigarette making machines are producing two (2) brands of cigarettes. Assuming lines 1 and 2 are manufacturing brand A, then the first two line entries relate to lines 1 and 2 and the third line entry relates to brand A and consists accordingly of a summary of the information previously presented on the cigarette making machines of lines 1 and 2. Similar presentation is preferred for lines 3, 4, and 5 and brand B. The result is, these nine items of information are conveniently columnated in the "Quality and Production Report" 60. Other formats of this report conceivably could be used.

It is recalled that both variance goal and production goal for each line and each brand are accordingly inserted in the system by production monitor D and stored in memory unit 44. The average variance for each line and each brand, in contrast, is computed by the arithmetic unit 42. Similarly, the actual production of cigarettes by the cigarette making machines comprising each group and each line is computed by arithmetic unit 42 by totalizing the respective values stored in memory unit 44.

Arithmetic unit 42 compares the variance goal with the average variance for each line and each brand, and each of these resultant ratios is incorporated in the "Quality and Production Report" 60. Each of these ratios is then compared with the reference variance ratio limit, and if the latter is exceeded, a red light is energized in production monitor D, otherwise the corresponding green light for the respective line or brand is energized. Similar comparisons are made on the production information for each line and each brand except that the ratio computed is that of actual production to production goal. Again, the computed ratio is compared with the reference production ratio limit and the appropriate green light of each line or each brand is energized accordingly if this computed ratio does not exceed the reference production ratio. If exceeded, however, a corresponding red light is energized. It should be apparent that each set of lights includes both a green light and a red light, the latter being energized whenever the respective ratio exceeds the predetermined corresponding ratio limit. As in the case of the computed variance ratio, the computed production ratio is also included in the "Quality and Production Report" 60 for each line and each brand.

Arithmetic unit 42 computes the total pounds of tobacco used by each line of cigarette machines. The product of the mean weight of a respective line and the total number of cigarettes produced by this line is the pounds of tobacco used by that line. The pounds of tobacco used by a brand is the arithmetic sum of the quantities of the respective lines producing that brand. Arithmetic unit 42 also totalizes the production time of those cigarette making machines comprising a line or a brand.

Under maintenance information is recorded the number of cigarette making machines that has exceeded the preset variance limit during the previous hour. It is recalled that the variance exceed signal is stored in memory unit 44 on a line basis. Thus, this information is readily available for inclusion in "Quality and Production Report" 60 for each line and each brand.

Thus, in FIGURE 7 after 25 seconds of each two minute interval the report 60 is being made. During those times, the master programmer 50 actuates computer 40 to effect, in keeping with the example above set forth:

(1) Cumulative addition of cigarettes produced for each of the five lines of machines and for each of the two brands respectively comprising two and three of those lines, (2) Cumulative addition of the machine operating time in minutes for each of those lines and brands, and (3) Cumulative addition of the limit exceed signals for each line and brand to determine the number of substantial machines therein.

Then, at the end of each hour, master programmer 50 actuates computer 40, multiplexer 48 and typewriter 52 to effect, for each line and brand:

(1) Removal from storage unit 44 and typing of the variance goals, (2) Computation and typing of the average variances, (3) Computation and typing of the ratios of each such average variance to the respective variance goal, (4) Removal from storage unit 44 and typing of the production goals, (5) Computation and typing of the actual production, (6) Computation and typing of the ratios of such actual productions to respective production goals, (7) Computation and typing of the pounds of tobacco used during prior hour, (8) Computation and typing of the number of machine minutes of operation, and (9) Computation and typing of the number of substandard machines causing limit exceed signals.

It should be pointed out that each succeeding hour, all of the information included in the "Quality and Production Report" 60, with the exception of the variance information, is brought forward in accumulative form. Thus, at the end of each work shift, the information presented is, in reality, a summary of quality and production levels attained and/or maintained by the system during the preceding shift period. At the start of a subsequent work shift, that information, previously stored in computer 40 but no longer needed for reference or computational purposes, is removed from memory unit 44 by conventional techniques or in accordance with instructions provided by the computer manufacturer.

From the foregoing description it will be apparent that the present invention provides a factory automation system, which system sets forth the means for automatically accumulating, summarizing, and presenting in concise convenient form that information necessary to attain and maintain effective quality, maintenance, and production control of a product produced on a continuous production line basis. It is conceivable that the application of the present invention to other industries or industrial processes may require certain minor or other modifications. Many such modifications are possible without departing from the intended scope of the instant invention. Moreover, it is to be expressly understood that the invention is not to be limited to the specific forms or arrangements herein described and shown but, rather, is to be limited only by the following appended claims.

What is claimed is:

1. A system for collecting data relative of the quality of a product produced by a plurality of product makers and thereupon presenting the information for evaluation, said system comprising, in combination, process controller means one each for each product maker to control same and each having means for continuously measuring a variable characteristic of said product and producing a respective first voltage signal representative of such measurement; means for periodically computing the variance of each said first voltage signal during a respective first predetermined time interval and generating a respective second voltage signal indicative of said variance; limit setting means generating a third voltage; comparator means for comparing at least one of said second voltages with the third voltage and emitting a fourth voltage when the latter is exceeded; goal-setting means generating a fifth voltage representative of a variance goal; computer means receiving said second, fourth and fifth voltages and operative to compute an average of the said second voltages for each said product maker over a second predetermined time interval substantially longer than said first time interval, to compute the frequency said fourth voltage is emitted and to compare said fifth voltage with the average of each said second voltage, said computer means generating a plurality of output voltage signals representative of each of said computations, monitor and comparison; and monitor means receiving said output voltage signals and including readout means for displaying the information carried by said output voltage signals for evaluation.

2. A system for collecting data relative of the quality of a product produced by a plurality of product makers and thereupon displaying an evaluation of these data, said system comprising, in combination, process controller means one each for each product maker to control same and having means for measuring a variable characteristic of said product and producing a first voltage representative of said measurement; a variance computer; first switching means for sequentially connecting each of said first voltages to said variance computer for a predetermined time interval at the end of which said variance computer emits a second voltage representative of the respective computed variance; limit setting means generating a predetermined third voltage; comparator means for comparing at least one of said second voltages with the third voltage and emitting a fourth voltage when the latter is exceeded; goal-setting means for generating a reference voltage indicative of a variance goal; second switching means having an output and operative to successively switch said second, fourth and said reference voltages to said output; converter means operatively connected to said second switching means at the output thereof to convert the voltage delivered thereat to a predetermined digital code; a digital computer including an output terminal and selectively receiving said digitally coded voltages to analyze the information carried by same and delivering to said output terminal an output signal analogous of an evaluation of such information, programming means synchronized with said digital computer for initiating the operation of said two switching means; and production monitor means operatively connected to said output terminal to receive said output signal and including readout means to display the said evaluation of the information collected.

3. The system as described in claim 2 wherein said limit setting means generates a plurality of third voltages one for each product maker and wherein means are included for said comparator means to compare said second voltages with a corresponding one of said third voltages.

4. A system for collecting data relative to the quality of a product produced by a plurality of product makers and thereupon displaying an evaluation of these data, said system comprising, in combination, process controller means one each for each product maker to control same and having means for measuring a variable characteristic of said product and producing a first voltage representative of said measurement; means included in said process controller means for emitting a second voltage in the form of a pulse each time a product is produced by a respective product maker; a variance computer; first switching means for sequentially connecting each of said first voltages to said variance computer for a predetermined time interval at the end of which said variance computer emits a third voltage representative of the respective computed variance; limit setting means generating a fourth voltage; comparator means for comparing each of said third voltages with the fourth voltage and emitting a fifth voltage when the latter is exceeded; counter means each operatively responsive to a respective one of said second voltage pulse emitting means to count the products produced and to generate count signals; second switching means having an output and operative to switch said third and fifth voltages sequentially to said output; converter means operatively connected to said second switching means at the output thereof to convert the voltages delivered thereat to a predetermined digital code; a digital computer selectively receiving said digitally coded voltages and said count signals to analyze the information carried by same and generating an output signal representing an evaluation of such information; programming means synchronized with said digital computer for initiating the operation of said two switching means; and production monitor means operatively responsive to said output signal and including readout means for displaying the evaluation which said output signal represents.

5. The system as described in claim 4 and including a second counter means one each for each of said product makers and each operative to register the total time during which the respective product maker is producing a product and to produce a time signal representative thereof, said second switching means being operative to switch, also said time signals sequentially to its output.

6. A system for collecting data relative of the quality of a product produced by a plurality of product makers and thereupon displaying an evaluation of these data, said system comprising, in combination, process controller means one each for each product maker to control same and having means for measuring a variable characteristic of said product and producing a first voltage representative of said measurement; a variance computer; first switching means for sequentially connecting each of said first voltages to said variance computer for a predetermined time interval, said variance computer emitting a second voltage representative of the respective computed variance at the end of said time interval; limit setting means generating a third voltage representative of a desired variance limit; comparator means for comparing each of said second voltages with the third voltage and emitting a fourth voltage when the latter is exceeded; goal setting means for generating a reference voltage indicative of a variance goal; second switching means having an output and operative to switch said second and fourth voltages and said reference voltage to said output; converter means operatively connected to said second switching means at the output thereof to convert the voltages delivered thereat to a predetermined digital code; a digital computer selectively receiving said digitally coded voltages to analyze the information carried by same and generating output signals representing an evaluation of such information; a third switching means receiving said output signals and having a plurality of output terminals each receiving a predetermined portion of said output signals; automatic typewriter means operatively connected to said third switching means at one of the output terminals thereof; programming means synchronized with said digital computer for initiating the operation of said three switching means; and production monitor means operatively connected to another of said output terminals and including readout means to display, in conjunction with said typewriter means, the said evaluation of the information collected.

7. A system for collecting data relative to the quality of a product produced by a plurality of product makers and thereupon displaying an evaluation of these data, said system comprising, in combination, process controller means one each for each product maker to control same and having means for measuring a variable characteristic of said product and producing a first voltage representative of said measurement; means included in said process controller means for emitting a second voltage in the form of a pulse each time a product is produced by a respective product maker; a variance computer; first switching means for sequentially connecting each of said first voltages to said variance computer for a predetermined time interval, said variance computer emitting a third voltage representative of the respective computed variance at the end of said time interval; limit setting means generating at least one fourth voltage representative of a desired variance limit; comparator means for comparing each of said third voltages with a said fourth voltage and emitting a fifth voltage when the latter is exceeded; counter means each operatively responsive to a respective one of said pulse emitting means to count the products produced to provide count outputs; means for generating first and second reference voltages indicative of variance goal and variance ratio respectively; second switching means having an output and operative to switch said third and fifth voltages and said first and second reference voltages to said output; converter means operatively connected to said second switching means at the output thereof to convert the voltages delivered thereat to a predetermined digital code; a digital computer selectively receiving said digitally coded voltages and said counter means outputs to analyze and evaluate the information carried by same and generating output signals representative thereof, said digital computer; a third switching means receiving said computer output signals and having a plurality of output terminals each receiving a predetermined portion of said output signals; at least one automatic typewriter means operatively connected to said third switching means at one of the output terminals thereof; programming means synchronized with said digital computer to initiate the operation of said three switching means; and production monitor means operatively connected to another of said output terminals and including readout means to display, in conjunction with said typewriter means, the said evaluation of the information collected.

8. The system as described in claim 7 wherein said limit setting means generates a plurality of fourth voltages one for each product maker, and said comparator means compares each of said third voltages with a corresponding one of said plurality of fourth voltages; and wherein said digital computer computes an average of said third voltages over a second predetermined time interval substantially larger than said first time interval, counts each of said fifth voltages emitted during said second interval, compares said first reference voltage with said averaged third voltage, and generates a voltage train representing the results of said count and comparison.

9. A system for accumulating and summarizing preselected information relating to a continuous process and presenting this information for an evaluation of the operation of a plurality of product makers each producing a product, said system comprising, process controller means operatively connected to each product maker to control same and including measuring means for determining the value of a selected characteristic of said product and producing a first voltage indicative of said determination, sensor means for detecting the presence of said product and emitting a second voltage in the form of a pulse for each product produced, and target setting means generating a third voltage representative of a desired value of said selected characteristic; a process control center means having a plurality of output terminals and a plurality of input terminals for receiving said voltages and including a variance computer having an input, means including an actuator means for sequentially switching each of said first voltages to the input of said computer for a first predetermined time interval and simultaneously connecting the corresponding one of said third voltages to one of said output terminals during said interval, said computer generating a fourth voltage indicative of the variance of the respective first voltage applied at the input thereof and transmitting said fourth voltage to another of said output terminals, and a plurality of counter means one each for receiving said voltage pulses emitted by each of said sensor means to count the number of pulses emitted, each of said counter means including means for generating a fifth voltage at a predetermined instant and delivering said fifth voltage to one of the remaining output terminals, said fifth voltage representing the count of said emitted pulses at said instant; production data center operatively connected to said plurality of output terminals and including means for receiving said third, fourth and fifth voltages, converter means, means for successively switching each of said third, fourth and fifth voltages to said converting means for conversion thereat to a predetermined digital code, a digital computer selectively receiving said digitally coded voltages and including an arithmetic unit for conducting mathematical operations and a control unit directing the sequence in which said operations are conducted, said computer generating a plurality of sequential output voltage signals each representative of the results of said mathematical operations respectively, and programming means synchronized with said digital computer for initiating the operation of said actuator and switch means; and production monitor means including indicator means one each to receive each of said plurality of output voltage signals and each operative when said respective voltage signal exceeds a predetermined bias voltage associated therewith.

References Cited in the file of this patent

UNITED STATES PATENTS

| | | |
|---|---|---|
| 2,171,044 | Nelsen et al. | Aug. 29, 1939 |
| 2,842,311 | Petrie | July 8, 1958 |

OTHER REFERENCES

"The Digital Computer as a Control Element," by Post, from "Automatic Control," October 1958, pp. 48–52.